I. B. RITTER.
AUTOMATIC DEVICE FOR BRINGING HYDRAULIC ELEVATOR CARS TO THE FLOOR LEVEL.
APPLICATION FILED MAY 28, 1907.

909,675.

Patented Jan. 12, 1909.

7 SHEETS—SHEET 1.

Witnesses:
M. R. Cleland
Wm. L. Rooney

Inventor:
Isaac B. Ritter
By his Attorney
F. DeWitt Goodwin

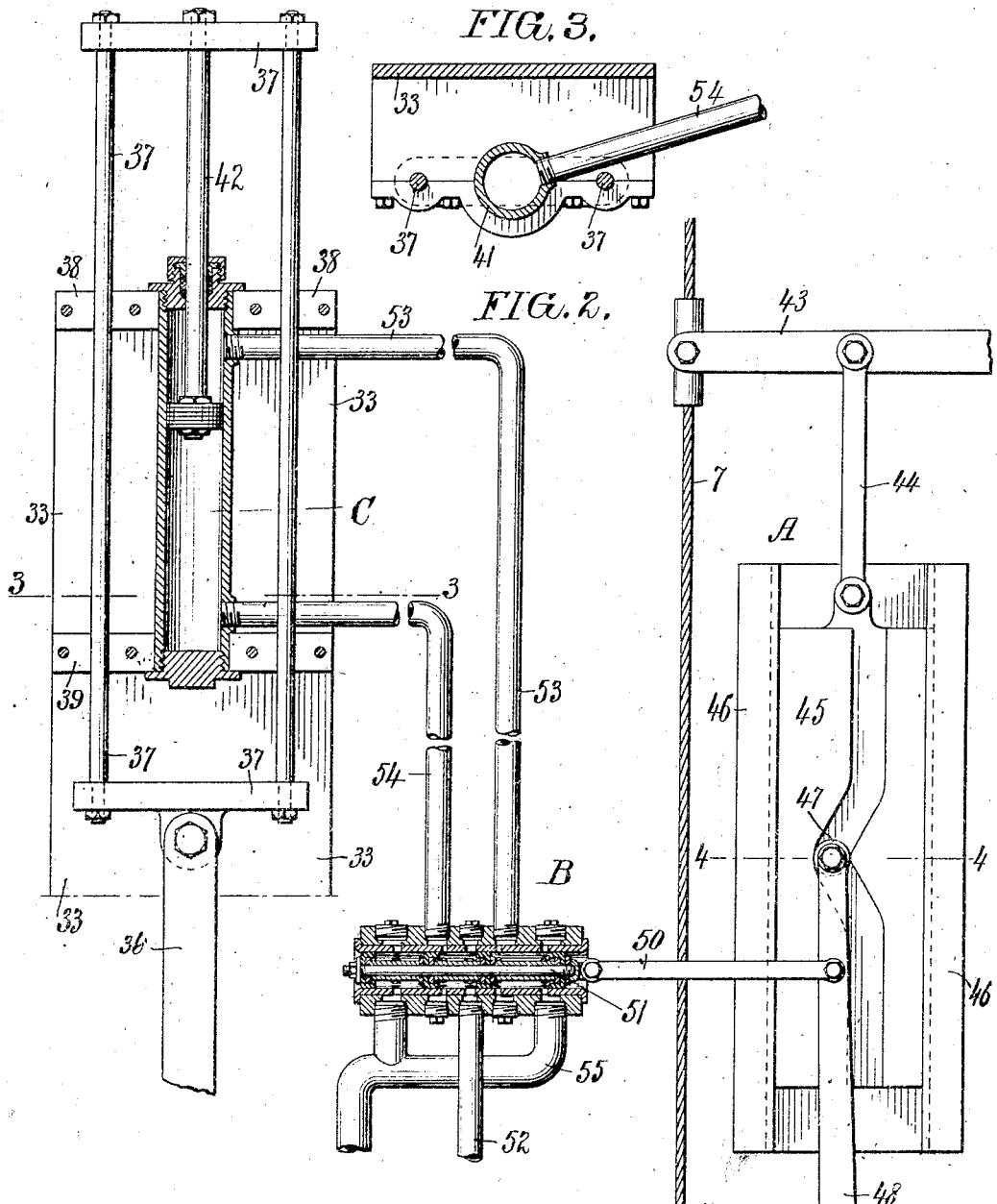

I. B. RITTER.
AUTOMATIC DEVICE FOR BRINGING HYDRAULIC ELEVATOR CARS TO THE FLOOR LEVEL.
APPLICATION FILED MAY 28, 1907.
909,675.
Patented Jan. 12, 1909.
7 SHEETS—SHEET 3.
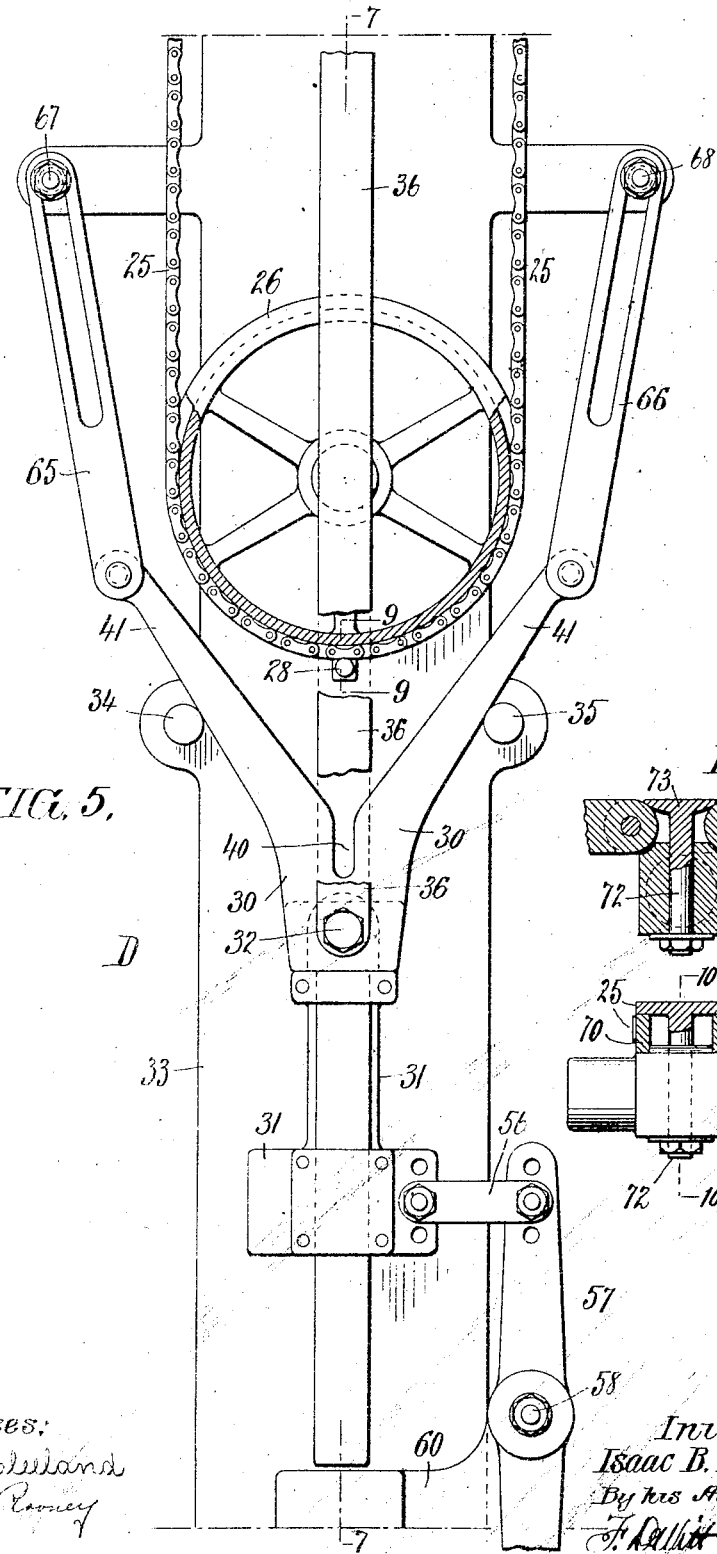
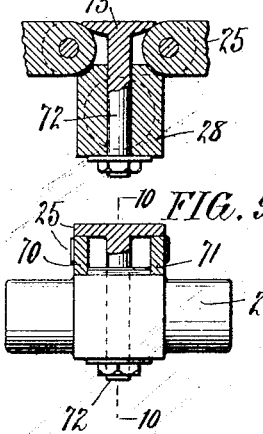
Witnesses:
Inventor
Isaac B. Ritter
By his Attorney I. B. RITTER.
AUTOMATIC DEVICE FOR BRINGING HYDRAULIC ELEVATOR CARS TO THE FLOOR LEVEL.
APPLICATION FILED MAY 28, 1907.

909,675.

Patented Jan. 12, 1909.
7 SHEETS—SHEET 4.

Witnesses:

Inventor:
Isaac B. Ritter
By his Attorney

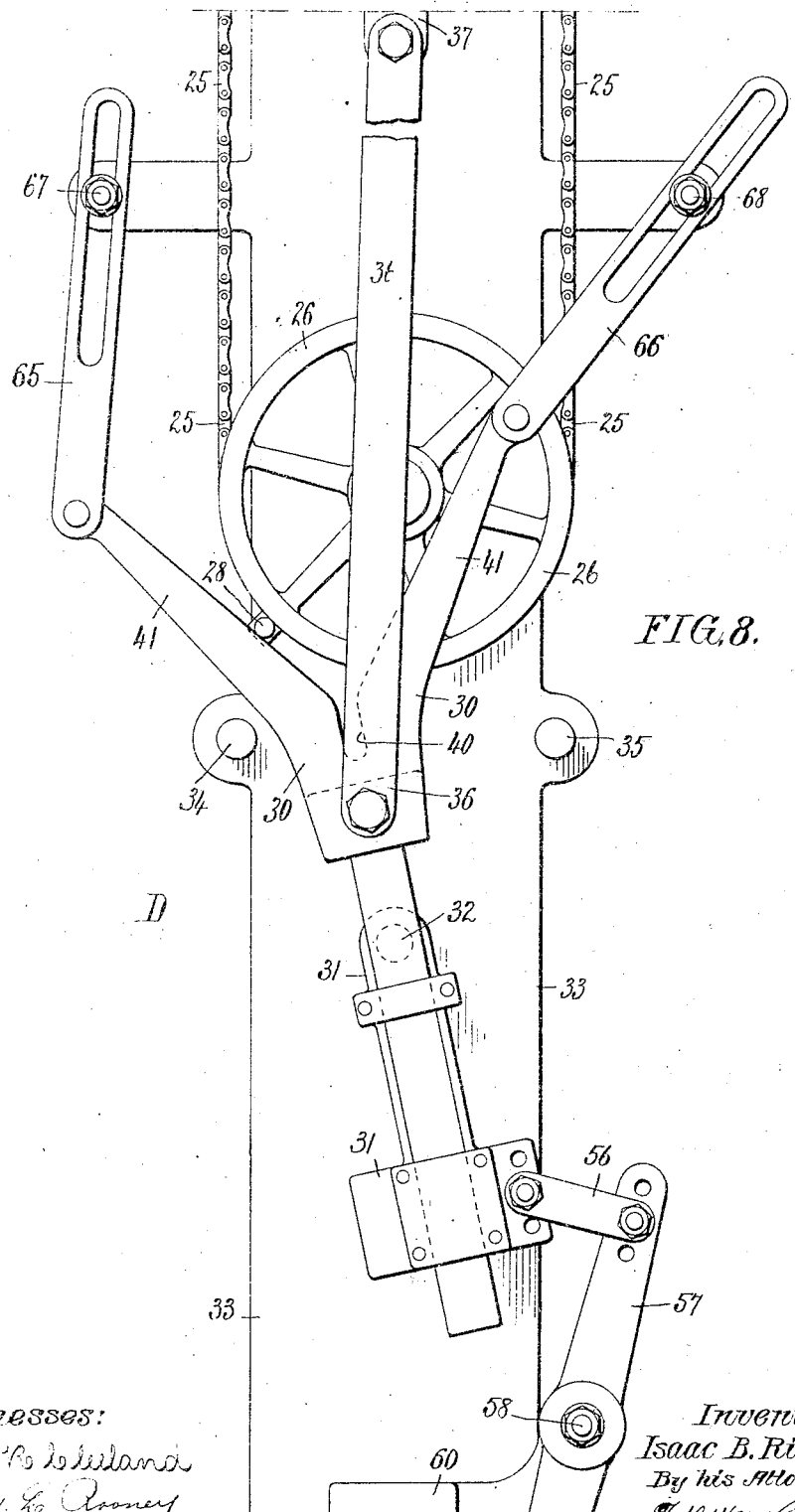

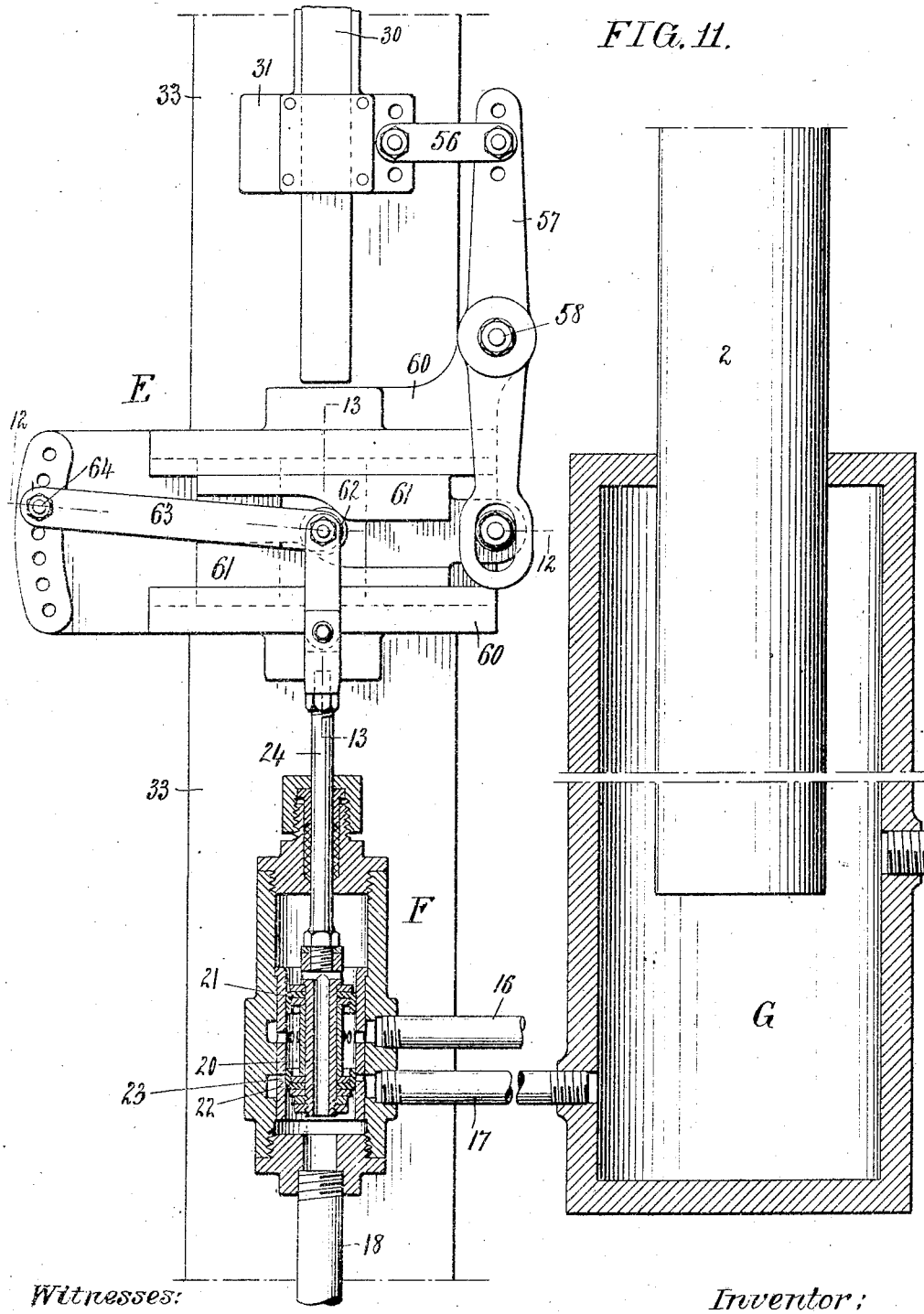

I. B. RITTER.
AUTOMATIC DEVICE FOR BRINGING HYDRAULIC ELEVATOR CARS TO THE FLOOR LEVEL.
APPLICATION FILED MAY 28, 1907.

909,675.

Patented Jan. 12, 1909.
7 SHEETS—SHEET 7.

Witnesses:

Inventor:
Isaac B. Ritter
By his Attorney
F. DeWitt Goodwin

UNITED STATES PATENT OFFICE.

ISAAC B. RITTER, OF PHILADELPHIA, PENNSYLVANIA.

AUTOMATIC DEVICE FOR BRINGING HYDRAULIC-ELEVATOR CARS TO THE FLOOR-LEVEL.

No. 909,675.  Specification of Letters Patent.  Patented Jan. 12, 1909.

Application filed May 28, 1907. Serial No. 376,118.

*To all whom it may concern:*

Be it known that I, ISAAC B. RITTER, a citizen of the United States, residing at Philadelphia, in the county of Philadelphia and State of Pennsylvania, have invented certain new and useful Improvements in an Automatic Operating Device for Bringing Hydraulic-Elevator Cars to the Floor-Level, of which the following is a specification.

My invention relates to elevators of the type known as hydraulic elevators.

The object of my invention is to provide means for automatically bringing the elevator car to the floor level when the car is stopped within six or eight inches of the floor and also for preventing the car moving away from the floor level due to the leaking of the valves.

My invention as generally stated consists in the employment, in addition to the main operating valve, of a supplementary valve to increase or diminish the pressure in the main hydraulic cylinder and means for automatically operating the said supplementary valve, together with various novel features of construction and organization of parts which will be hereinafter fully set forth and claimed.

Figure 1:
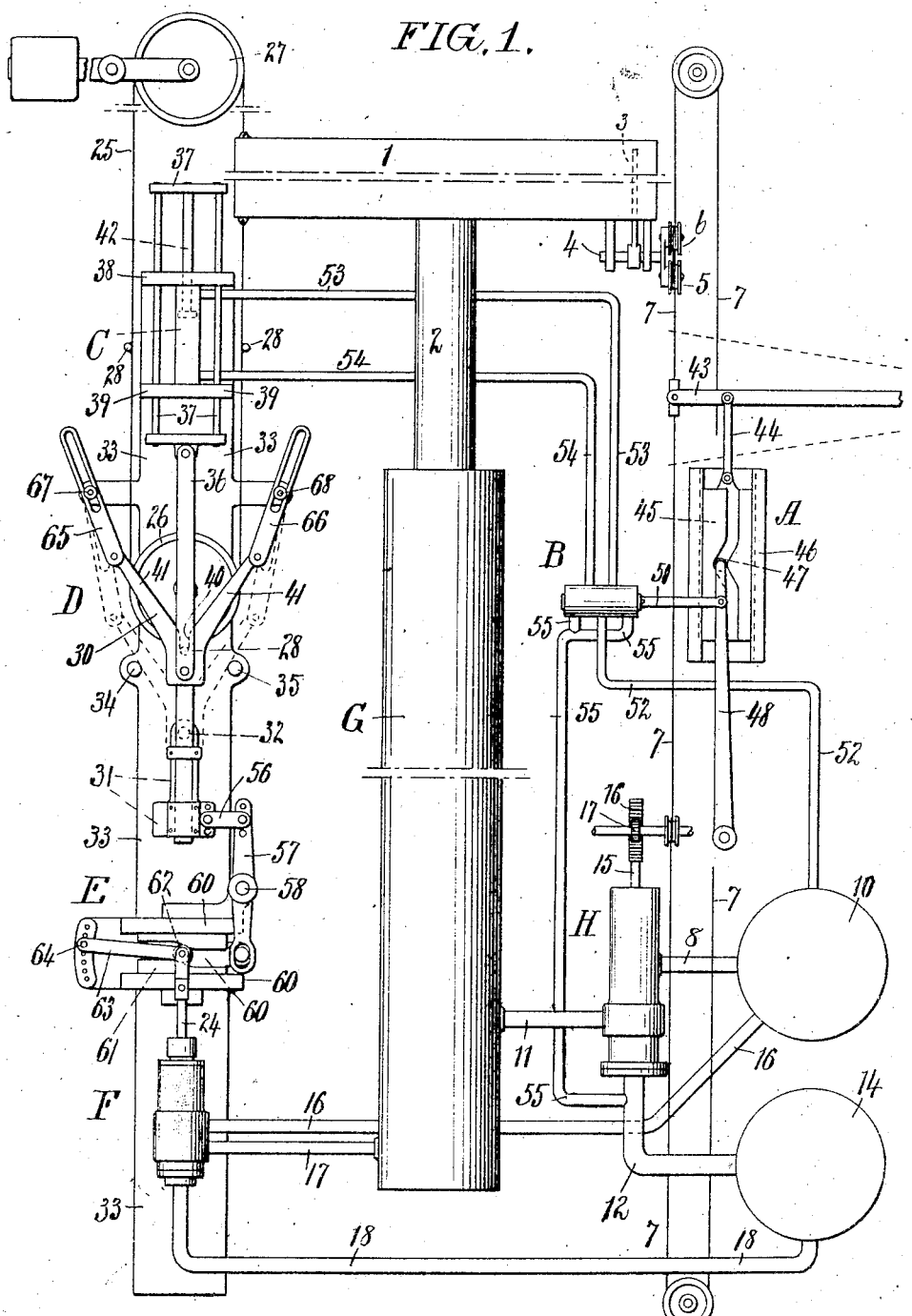
Figure 6:
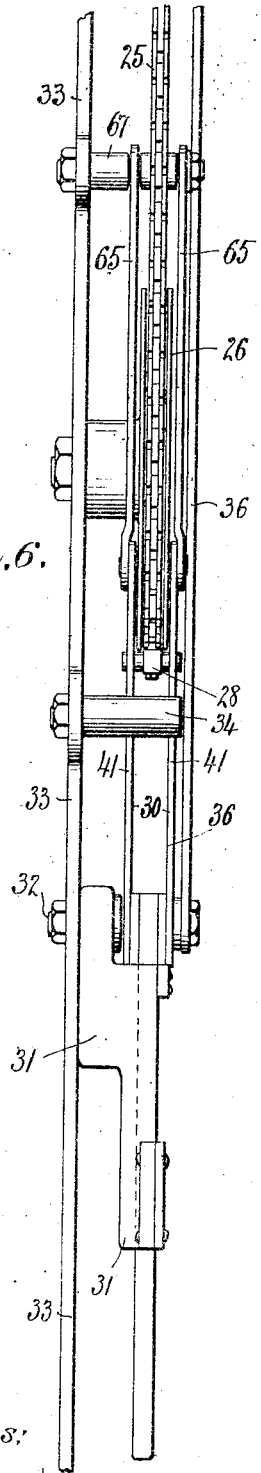
Figure 7:
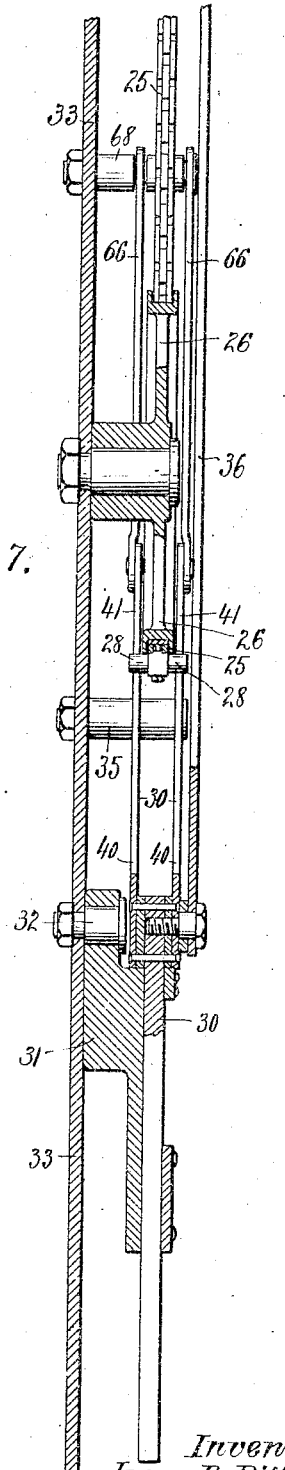
Figure 12:
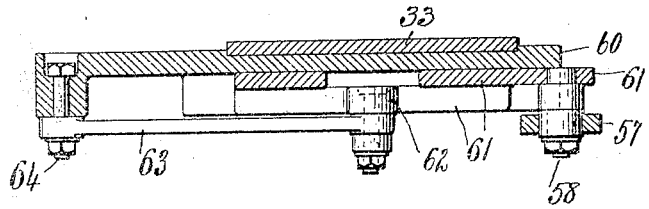
Figure 13:
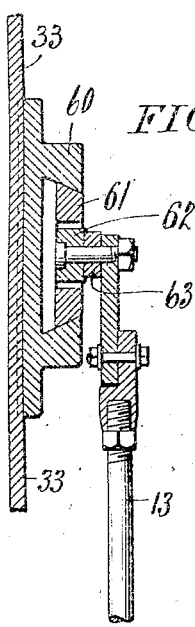
Figure 14:
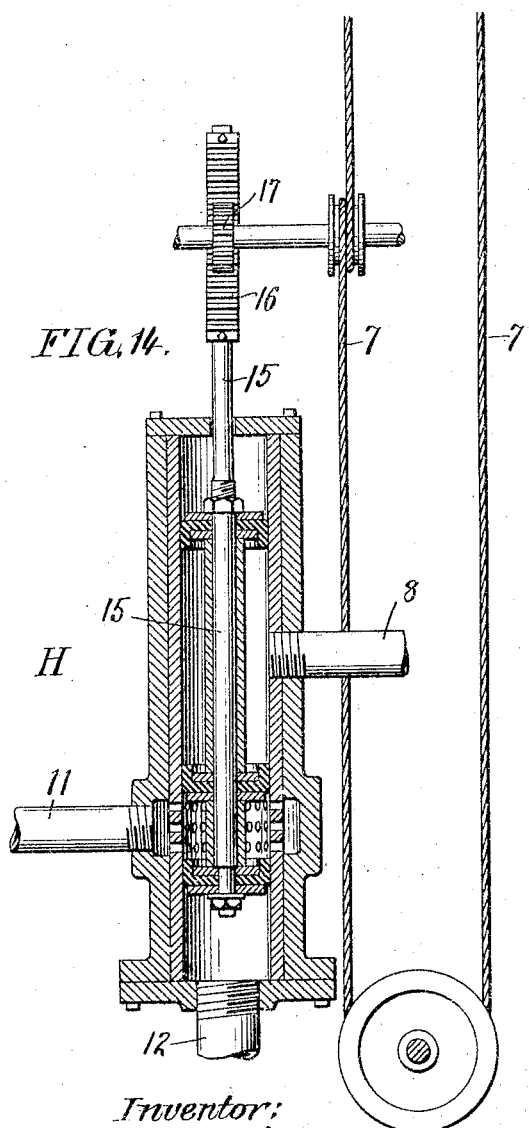

Referring to the drawings:— Figure 1 is a diagrammatic view of the elevator car operated by a plunger and illustrating the mechanism employed in carrying out my invention; Fig. 2 is an elevation, partly in section, of the parts A, B and C shown in Fig. 1 (drawn on a larger scale); Fig. 3 is a horizontal section as on line 3—3 Fig. 2; Fig. 4 is a horizontal section as on line 4—4 Fig. 2; Fig. 5 is an elevation of the parts D shown in Fig. 1 (drawn on a larger scale); Fig. 6 is a side view of Fig. 5; Fig. 7 is a vertical section as on line 7—7 Fig 5; Fig. 8 is a view similar to Fig. 5 showing the parts in a different position; Fig. 9 is a sectional view as on line 9—9 Fig. 5 showing a link of the chain with the pin attached thereto, drawn on a larger scale; Fig. 10 is a sectional view as on line 10—10 Fig. 9; Fig. 11 is an elevation of the parts E shown in Fig. 1 also a vertical sectional view of the supplementary valve F and the plunger cylinder G (drawn on a larger scale); Fig. 12 is a horizontal section on line 12—12 Fig. 11; Fig. 13 is a vertical section as on line 13—13 Fig. 11; Fig. 14 is a vertical sectional view of the controlling valve H shown in Fig. 1.

In the drawings 1 represents the car carried by a plunger 2 which enters the plunger cylinder G. The car 1 is provided with the usual form of controlling mechanism consisting of a lever 3 on a shaft 4 carrying wheels 5 and 6 around which passes the controlling cable 7.

The controlling cable 7 operates the controlling valve H, more clearly shown in Fig. 14, which is connected by a pipe 8 with the high pressure tank 10, by a pipe 11 with the plunger cylinder G and by a pipe 12 with the exhaust or low pressure tank 14. The controlling valve H has a piston 15 operated through a rack and pinion 16 and 17 by the controlling cable 7.

When the piston 15 is in the position shown in Figs. 1 and 14 the elevator car will be at rest, when the piston 15 is lowered it will allow the water to flow from the high pressure tank 10 into the plunger cylinder G and raise the car; when the piston 15 is raised the water will flow from the plunger cylinder G into the low pressure tank 14 and allow the car to descend.

A supplementary valve F, see Figs. 1 and 11, is provided to move the plunger carrying the car, independently of the controlling valve H and the controlling lever 3 upon the car. The supplementary valve F is connected with the high pressure tank 10 by a pipe 16 and with the plunger cylinder G by the pipe 17 and with the low pressure tank 14 by a pipe 18. The supplementary valve F contains a piston 20 having heads 21 and 22 at either side of the apertures for admitting water from the high pressure tank. The head 22 normally covers a circular row of apertures 23 leading to the pipe 17 running to the plunger cylinder G. As the head 22 is narrow a very slight movement of the piston 20 will open the apertures 23.

The piston 20 is constructed with a hollow core so that the pressure will be equal on both the heads 21 and 22, and as the high pressure is admitted between the said heads the piston will be balanced and will not move except by the action of the valve stem 24. When the piston 20 is lowered the water from the high pressure tank 10 will flow into the plunger cylinder and raise the plunger and the car; when the piston 20 is raised the water will flow from the plunger cylinder into the pipe 18 leading to the low pressure tank 14 which will allow the car to descend.

The movement of the plunger and the car which is caused by the operation of the supplementary valve F is very slight as only a movement of a few inches will be required to bring the car to the floor level. The supplementary valve F is automatically brought into action by the position of the car in the following manner:

A flexible member preferably a chain 25 is mounted on sheaves 26 and 27, having its ends attached to the top and bottom of the car, as shown in Fig. 1. Upon the chain are projections or pins 28 corresponding in number to the floors in the elevator shaft. Each projection 28 is located so that it will be at a certain point when the car is at the corresponding floor level.

The pins 28 upon the chain 25 are engaged by a bifurcated cam member 30 slidably mounted in an oscillating head 31 which is pivoted at the point 32 to the back plate 33, to which are secured several of the different parts of the mechanism and is preferably located in the basement of the building.

The oscillating head 31 is connected so as to operate the supplementary valve F as more fully hereinafter described.

When the car is running the bifurcated member 30 is in the position shown in Fig. 5, and in dotted lines Fig. 1, resting upon the pins 34 and 35 projecting from the back plate 33. The chain 25 carrying the pins 28 may run free as the car moves up or down, and the supplementary valve F will be in a closed position, see Figs. 1 and 11, which will not change the pressure in the plunger cylinder G.

When the operating mechanism upon the car is brought into a position to stop the car the bifurcated member 30 is raised into the position shown in full lines Fig. 1 so as to engage one of the pins 28 on the chain 25.

The bifurcated member 30 is raised by a link 36 connected to a yoke 37 slidably mounted in bearings 38 and 39 on the back plate 33. Between the bearings 38 and 39 is a cylinder C having a piston 42 which is connected to the yoke 37 carrying the link 36.

The lifting cylinder C is controlled by a preliminary valve B which is operated by the controlling cable 7, see Figs. 1 and 2. A pivoted arm 43 having its free end attached to the controlling cable 7 and having a connecting link 44 carrying a cam 45 slidably mounted in a guide 46 acts on a roller 47 carried by a pivoted lever 48 which is connected by a link 50 to the piston 51 of the valve B.

The preliminary lifting valve B is connected to the high pressure tank 10 by a pipe 52; to the lifting cylinder C by pipes 53 and 54 connected to the top and bottom of said cylinder respectively; and to the exhaust tank by pipes 55.

When the controlling mechanism upon the car is in a position to stop the car the piston of the valve B will be drawn into the position shown in Figs. 1 and 2, the high pressure port will then be open and also the pipe 54 leading to the bottom of the lifting cylinder C will be open so that the water from the high pressure tank will raise the plunger 42 in the lifting cylinder C which will raise the yoke 37 carrying the bifurcated member 30 so that the latter will engage a pin 28 on the chain 25. Thus whenever the controlling cable is brought to a position to stop the car the bifurcated member will be raised.

The bifurcated member 30 as above stated is slidably mounted in an oscillating head 31 pivoted to the back-plate 33, as shown in Figs. 5—6 and 7. This oscillating head 31 is connected by a link 56 to a lever 57 pivoted at 58 to the frame 60. Said frame forms a guide for the sliding cam 61, see Figs. 1 and 11, which acts on a roller 62 on the valve stem 24 of the supplementary valve F. An arm 63 is provided to hold the roller 62 in place. The said arm 63 is pivoted in the frame 60 at the point 64.

The pivot point of the arm 63 may be varied to change the radius of the arc through which the roller 62 travels, which will increase or diminish the speed of the movement of the piston of the supplementary valve F. By raising the pivot point of the arm the piston will act slower and by lowering the said arm the piston will act quicker.

When the car is stopped directly at the floor level the corresponding pin on the chain will be on the vertical center line of the sheaves carrying the chain 25. When the bifurcated member 30 is then raised it will find the pin without being forced by the pin out of its normal position and therefore the supplementary valve F will not be opened and the car will remain at the floor level.

When the car is not at the floor level say, for example it is stopped a few inches below the floor level, the pin on the chain 25 will be in a position such as shown in Fig. 8. The bifurcated member as it is raised will bear against the pin and will be forced out of its normal position causing the oscillating head to move the lever 57 and operate the cam 61 to lower the piston of the valve F which will allow the water from the high pressure tank to flow into the plunger cylinder and raise the car until the car is in such a position that the pin on the chain 25 will be moved back to the central position, which will allow the bifurcated member to assume its normal position as shown in Fig. 1, which will close the valve F and allow the car to remain at the floor level.

Should the controlling valve H leak the car will move away from the floor level, but as a very slight movement of the car in either direction will be sufficient to move the chain and shift the bifurcated member and operate the supplementary valve F, the car will be brought back to the floor level automatically. Thus the labor and expense of keeping the packing of the controlling valve in perfect condition is overcome.

When the operating mechanism upon the car is shifted to start the car in either direction the bifurcated member will be dropped out of action of the pin on the chain so that the chain can run free. This is done by the controlling cable 7 shifting the cam 45, which will move the preliminary valve B into a position to empty the lifting cylinder C, thus allowing the bifurcated member to fall. The bifurcated member will rest upon the pins 34 and 35 on the back plate so that it will normally rest in a vertical position which will close the supplementary valve F.

Should the controlling mechanism upon the car be brought to a position to stop the car when the car is midway between the floors the bifurcated member will be raised but it will not find a pin on the chain 25. When the car is stopped close to the floor line, say within eight or ten inches above or below the floor, the pin on the chain will be within reach of the arms 41 of the bifurcated member. The arms 41 will act as a cam surface as they contact with the pinion the chain and the bifurcated member will be moved to one side of its central position which will cause the supplementary valve to open.

The lifting cylinder C will continue to hold one of the arms 41 of the bifurcated member against the pin on the chain as long as the controlling lever on the car is in a position to stop the car. The supplementary valve F will remain open until the car is moved in the proper direction towards the floor level which will cause the pin on the chain to move towards the center line of the sheave. When the pin reaches the center line of the sheave the bifurcated member can be raised by the lifting cylinder C to its highest position so that the slot 40 between the arms of the bifurcated member will embrace the pin. By having the pin enter the vertical slot 40 formed in the bifurcated member, the movement of the latter will be more sensitive and there will be less lost motion than there would be if the pin acted against the oblique surface of the arms 41 of the bifurcated member.

The bifurcated member 30 has links 65 and 66 pivotally connected to the outer end of the arms 41, which links are guided by pins 67 and 68 projecting from the back plate 33. Said pins are adapted to enter elongated slots formed in said links 65 and 66. These links direct the pins 28 on the chain 25 into the bifurcated member 30 and also prevent the possibility of the bifurcated member getting out of place which might allow a pin 28 to pass outside of the arms 41 in case the bifurcated cam member 30 should not resume its normal position.

The manner of attaching the projections or pins 28 to the flexible member or chain 25 is illustrated in Figs. 9 and 10. The pin 28 has a central portion which is square and which fits against the edges of the side plates 70 and 71 forming a link. This pin is held in place by a bolt 72 having a head 73 which extends between the two side plates of the link with its under surface curved so as to fit into the curved portion of the side plates 70 and 71 forming the chain.

Having thus described my invention I claim and desire to secure by Letters Patent.

1. An elevator comprising in its construction a car, a controlling valve, a supplementary valve, means for operating said supplementary valve to raise or lower said car independently of said controlling valve.

2. An elevator comprising in its construction a car, a controlling valve, means upon said car to operate said controlling valve, a supplementary valve, and means for automatically operating said supplementary valve to raise or lower the car and bring the same to the floor level.

3. An elevator comprising in its construction a car, a controlling valve, means upon the car to operate said controlling valve, a supplementary valve, and means for operating said supplementary valve to raise or lower the car when the said controlling valve is in a position to stop the car.

4. An elevator comprising in its construction a car, a controlling valve, means upon the car to operate said controlling valve, a supplementary valve, means for operating said supplementary valve when said controlling valve is in a position to stop the car, and means controlled by the position of the car to actuate said supplementary valve to bring the car to the floor level.

5. An elevator comprising in its construction a car, a controlling valve, a supplementary valve, a flexible member coupled with and controlled by the movements of said car, and means actuated by said flexible member for operating said supplementary valve.

6. An elevator comprising in its construction a car, a controlling valve, a supplementary valve, a flexible member coupled with and controlled by the movements of said car, projections on said flexible member, a bifurcated member for engaging one of said projections and means for connecting said bifurcated member with said supplementary valve to actuate the latter.

7. An elevator comprising in its construction a car, a controlling valve, a controlling cable, a supplementary valve, a flexible member coupled to said car, a projection on said flexible member, a bifurcated member connected with and adapted to operate said supplementary valve and means for bringing said bifurcated member within the line of travel of said projection on said flexible member when said controlling valve is in a position to stop the car.

8. An elevator comprising in its construction a car, a controlling valve, a controlling cable, a supplementary valve, a flexible member coupled with said car, a projection on said flexible member, a cam member connected with and adapted to actuate said supplementary valve, a lifting cylinder to bring said bifurcated member into engagement with said projection on said flexible member and means for controlling said lifting cylinder.

9. An elevator comprising in its construction a car, a controlling valve, a controlling cable, a supplementary valve, a flexible member coupled with said car, projections on said flexible member, a bifurcated member connected with and adapted to actuate said supplementary valve, a lifting cylinder to bring said bifurcated member into engagement with a projection on said flexible member, a preliminary valve to control said lifting cylinder and means for operating said preliminary valve.

10. An elevator comprising in its construction a car, a controlling valve, a controlling cable, a supplementary valve, a flexible member coupled with said car, projections on said flexible member, a bifurcated member connected with and adapted to actuate said supplementary valve, a lifting cylinder to bring said bifurcated member into engagement with a projection on said flexible member, a preliminary valve to control said lifting cylinder and means for operating said preliminary valve by the movements of said controlling cable.

11. An elevator comprising in its construction a car, a controlling valve, a controlling cable, a supplementary valve, a flexible member coupled with said car, projections on said flexible member, a bifurcated member connected with and adapted to actuate said supplementary valve, a lifting cylinder, a piston in the said cylinder, a yoke carried by said piston, a link connecting said yoke and said bifurcated member, bearings in which said yoke slides, a preliminary valve to control said lifting cylinder, and means for operating said preliminary valve by the movements of the controlling cable.

12. An elevator comprising in its construction a car, a controlling valve, a controlling cable, a supplementary valve, a flexible member coupled with said car, projections on said flexible member, a bifurcated member connected with and adapted to actuate said supplementary valve, a lifting cylinder to bring said bifurcated member into engagement with a projection on said flexible member, a preliminary valve connected with said lifting cylinder to control the same, a piston in said preliminary valve, a lever having a roller, a link between said lever and said piston, a cam to engage said roller, and means for operating said cam.

13. An elevator comprising in its construction a car, a controlling valve, a controlling cable, a supplementary valve, a flexible member coupled with said car, projections on said flexible member, a bifurcated member connected with and adapted to actuate said supplementary valve, a lifting cylinder to bring said bifurcated member into engagement with a projection on said flexible member, a preliminary valve connected with said lifting cylinder to control the same, a piston in said preliminary valve, a lever having a roller, a link between said lever and said piston, a cam to engage said roller, and means for connecting said cam with said controlling cable.

14. An elevator comprising in its construction a car, a controlling valve, a supplementary valve, a counter-balanced sheave at the top of the elevator shaft, a sheave located at the bottom of the elevator shaft, a flexible member passing around said sheaves having its ends attached to the top and bottom of the car respectively, said flexible member having projections thereon, a cam member for engaging said projections and means for connecting said cam member with said supplementary valve to actuate the latter.

15. An elevator comprising in its construction a car, a controlling valve, a supplementary valve, a chain, said chain having links formed of two side plates, a pin having its central portion bearing against each of said side plates, said pin projecting beyond the sides of said chain, a bolt having an enlarged head adapted to bear against said side plates and adapted to pass through said pin and secure the same to said side plates, a bifurcated member adapted to engage said pin, and means for connecting said bifurcated member with said supplementary valve to actuate the latter.

16. An elevator comprising in its construction a car, a supplementary valve, a preliminary valve, a flexible member coupled with said car, pins carried by said flexible member and projecting from either side of the same, a bifurcated member consisting of duplicate plates adapted to pass outside of said flexible member and engage the said pins projecting beyond the sides of said flexible member, and means for connecting said bifurcated member with said supplementary valve to actuate the latter.

17. An elevator comprising in its construction a car, a controlling valve, a supplementary valve, a flexible member coupled with said car, projections on said flexible member, a bifurcated member for engaging one of said projections, an oscillating head in which said bifurcated member is slidably mounted and means for connecting said oscillating head with said supplementary valve to actuate the latter.

18. An elevator comprising in its construction a car, a controlling valve, a supplementary valve, a flexible member coupled with said car, pins on said flexible member, a bifurcated member for engaging one of said pins, links pivoted to the ends of the arms of said bifurcated member, pins over which said links are slidably mounted, an oscillating head in which bifurcated member is mounted and means for connecting said oscillating head with said supplementary valve to actuate the latter.

19. An elevator comprising in its construction a car, a controlling valve, a supplementary valve, a flexible member coupled with said car, pins on said flexible member, a bifurcated member for engaging one of said pins, said bifurcated member having a vertical slot formed therein to embrace the pin carried by said flexible member, a back plate on which said bifurcated member is pivotally mounted and means for connecting said oscillating head with said supplementary valve to actuate the same.

20. An elevator comprising in its construction a car, a controlling valve, a supplementary valve, a flexible member coupled with said car, pins on said flexible member, a bifurcated member for engaging one of said pins, an oscillating head in which said bifurcated member is mounted, a back plate, pins projecting from said back plate upon which said bifurcated member may rest, and means for connecting said oscillating head with said supplementary valve to actuate the same.

21. An elevator comprising in its construction a car, a controlling valve, a supplementary valve, a flexible member coupled with said car, pins on said flexible member, a bifurcated member for engaging one of said pins, an oscillating head in which said bifurcated member is mounted, a cam, a pivoted lever connected at one end to said cam and at the opposite end to said oscillating head, a roller adapted to be acted on by said cam, and a piston in said supplementary valve operated by said roller.

22. An elevator comprising in its construction a car, a controlling valve, a supplementary valve, a flexible member coupled with said car, pins on said flexible member, a bifurcated member for engaging one of said pins, an oscillating head in which said bifurcated member is mounted, a sliding cam, a lever connecting said cam with said oscillating head, a guide for said sliding cam, a roller, a piston in said supplementary valve operated by said roller, an arm connected at one end to said roller and pivoted at its other end to said guide and means for adjusting the pivot point of said arm.

In testimony whereof I affix my signature in presence of two witnesses.

ISAAC B. RITTER.

Witnesses:
HOWARD S. GOODMAN,
EMERSON R. HALDEMAN.